United States Patent [19]

Richardson

[11] Patent Number: 4,474,938
[45] Date of Patent: Oct. 2, 1984

[54] PROCESS FOR POLYMERIZATION OF THERMOTROPIC POLYESTERS AND POLYESTERS

[75] Inventor: John C. Richardson, St. Louis, Mo.

[73] Assignee: Monsanto Company, St. Louis, Mo.

[21] Appl. No.: 520,043

[22] Filed: Aug. 4, 1983

[51] Int. Cl.³ .................. C08G 63/18; C08G 63/60
[52] U.S. Cl. ................................... 528/176; 528/125; 528/126; 528/128; 528/173; 528/190; 528/191; 528/193; 528/194; 528/271
[58] Field of Search ............ 528/125, 126, 128, 173, 528/176, 190, 191, 193, 194, 271

[56]  References Cited
U.S. PATENT DOCUMENTS

| | | | |
|---|---|---|---|
| 3,637,595 | 1/1972 | Cottis et al. | 528/193 |
| 3,884,876 | 5/1975 | Cottis et al. | 528/193 |
| 4,064,108 | 12/1977 | Iwata et al. | 528/193 |
| 4,067,852 | 1/1978 | Calundann | 528/193 |
| 4,075,173 | 2/1978 | Maruyama et al. | 528/193 |
| 4,083,829 | 4/1978 | Calundann et al. | 528/193 |
| 4,140,846 | 2/1979 | Jackson, Jr. et al. | 528/193 |
| 4,311,824 | 1/1982 | Fayolle | 528/193 |
| 4,319,017 | 3/1982 | Kosanovich | 528/193 |
| 4,377,681 | 3/1983 | Deex | 528/193 |
| 4,390,681 | 6/1963 | Deex | 528/193 |

Primary Examiner—Lester L. Lee
Attorney, Agent, or Firm—R. Bruce Blance; William J. Farrington; Paul D. Matukaitis

[57] ABSTRACT

Thermotropic polyesters consisting essentially of units derived from diphenols and aromatic dicarboxylic acids are prepared via monocarboxylic acid esters of the diphenols by acidolysis in two steps. The first step is a melt prepolymerization to form a prepolymer of inherent viscosity in the range of 0.12 to 0.16 dl g$^{-1}$. The second step is a melt polymerization by a single pass through a wiped film reactor, in which the film of polymer melt is subjected to a high rate of shear and to a temperature in the range within which the polyester forms an anisotropic melt phase. The polyester product has an inherent viscosity of at least about 0.5 dl g$^{-1}$.

30 Claims, No Drawings

PROCESS FOR POLYMERIZATION OF THERMOTROPIC POLYESTERS AND POLYESTERS

BACKGROUND OF THE INVENTION

This invention relates to a process of melt polymerization of thermotropic polyesters and to the thermotropic polyesters prepared by the melt polymerization process.

Polyesters prepared from selected combinations of aromatic dicarboxylic acid and diphenols are well known to possess thermotropic behavior. Such polyesters may also include units derived from p-hydroxybenzoic acid and aliphatic dicarboxylic acids.

Aromatic polyesters have been prepared by interfacial polymerization by reacting acid chlorides dissolved in an organic solvent incompatible with water and diphenols dissolved in an aqueous alkali solution. Such a process is generally uneconomical and cannot be used for p-hydroxybenzoic acid systems. The polyester resins can also be prepared by melt polymerization but the high viscosity of polymers of commercially useful molecular weight at the shear rates generated in conventional bulk polymerization kettles makes the polyesters rather intractable and difficult to process by this method. The problem of intractability has been circumvented by solution polymerization, slurry polymerization and solid state polymerization of the polyesters but each of these methods is attended with problems. Solution and slurry polymerizations are carried out in organic liquids of high boiling point, which are difficult to remove from the final product and which may degrade and interact with the polymer product, impairing the properties and imparting high color to it. Solid state polymerization is generally slow and uneconomical because of a crystallization step, the slow rate of polymer advancement and the need for large volume equipment. The product of solid state polymerization is unsatisfactory because it is crosslinked and frequently contains a gel fraction which impairs the solubility and rheology of the product. A continuous melt polymerization of amorphous aromatic polyesters by means of wiped film reactors has been disclosed. However the high melt viscosity of such polyesters necessitates the use of a train of wiped film reactors and makes the attainment of high molecular weight in the polymeric products very difficult.

The process of the present invention is limited to aromatic polyesters capable of thermotropic behavior. The process comprises: A. melt polymerization of a monomer reaction mixture consisting essentially of an aromatic dicarboxylic acid and a diphenol diester to provide a prepolymer of inherent viscosity in the range of about 0.09 to about 0.16 dl g$^{-1}$; and B. passage of the melt through a wiped film reactor to provide a molten film subjected to a shear rate of at least about 100 sec$^{-1}$ and an ambient pressure of less than about 3 kPa, the rate of passage of the molten polymer in the wiped film reactor being adjusted to provide a residence time sufficient to allow the molecular weight of the polymer to advance to a level corresponding to an inherent viscosity of at least about 0.5 dl g$^{-1}$, and the temperature of the wiped film reactor being maintained at less than about 400° C. and in the range in which the thermotropic polyester forms an anisotropic melt phase.

Advantages which are provided by the process include low capital cost for polymer production, reduction in polymer processing time and production of polymer which provides superior mechanical performance and rheology. Another aspect of the invention is therefore the polymer produced by the process of the invention.

The monomer reaction mixture consists essentially of any combination of aromatic dicarboxylic acids and diphenol diesters which upon condensation by acidolysis yields a thermotropic polyester. The aromatic dicarboxylic acids include isophthalic acid, terephthalic acid, 1,5-, 2,5-, 2,6- and 2,7-naphthalic acids, 4,4'-bibenzoic acid, ethylene dioxy-4,4'-dibenzoic acid, 2,5-dichloroterephthalic acid, 4-carboxybenzene acetic acid, 4-carboxybenzenepropionic acid, 4,4'-stilbene dicarboxylic acid, 4,4'-oxydibenzoic acid, 4,4'-thiodibenzoic acid, bis(4-carboxyphenyl)methane and 1,2-bis(4-carboxyphenyl)ethane. The diphenols used in the form of their diesters include hydroquinone, resorcinol, 2-chlorohydroquinone, 2,6-dichlorohydroquinone, 2-bromohydroquinone, 2-methylhydroquinone, 2,6-dimethylhydroquinone, 2-ethylhydroquinone, t-butylhydroquinone, 4',4'-dihydroxydiphenyl, oxy-4,4'-diphenol, thio-4,4'-diphenol, bis(4-hydroxyphenyl)sulfone, 1,5-, 2,5-, 2,6- and 2,7-naphthols, bis(4-hydroxyphenyl)methane, 1,2-bis(4-hydroxyphenyl)ethane, 2,2-bis(4-hydroxyphenyl)propane, 2,6-dihydroxyanthraquinone, 4,4'-dihydroxybenzophenone, 3,3'-dichloro- 4,4'-dihydroxybenzophenone, and 3,3'-dimethyl-4,4'-dihydroxybenzophenone.

Also the monomer reaction mixture may include m- and p-hydroxybenzoic acids, 3-methyl-4-hydroxybenzoic acid, 3-chloro-4-hydroxybenzoic acid, 4-hydroxy-4'-carboxybenzophenone, and 6-hydroxy-2-naphthoic acid present as esters of an aliphatic monocarboxylic acid, and may include an aliphatic dicarboxylic acid such as a linear $C_7$ to $C_{12}$ dicarboxylic acid or hexahydroterephthalic acid. The monomer reaction mixture is selected to provide a thermotropic polyester which melts at a temperature less than about 400° C. and preferably at a temperature less than about 350° C. Also advantageously the aliphatic monocarboxylic acid used to esterify the phenolic groups of the monomers is a $C_2$ to $C_4$ monocarboxylic acid and is preferably acetic acid. The esters may be prepared separately prior to their addition to the reaction mixture or they may be prepared in situ by addition of excess acid anhydride to a mixture of phenols and dicarboxylic acids. The preferred acid anhydride is acetic anhydride.

A preferred monomer reaction mixture consists essentially of monocarboxylic acid ester of p-hydroxybenzoic, monocarboxylic acid diester of hydroquinone, and monocarboxylic acid diester of 2,2-bis(4-hydroxyphenyl)propane and an aromatic dicarboxylic acid selected from the group consisting of isophthalic acid, terephthalic acid and 1,5-, 2,5-, 2,6- and 2,7-naphthalic acids, in which the 2,2-bis-(4-hydroxyphenyl)propane diester is in the range of 0 to about 20 mole percent of the total diphenol diester and the mole ratio of p-hydroxybenzoic acid ester to diphenol diester is in the range of about 1:4.5 to about 4:3. The preferred aromatic dicarboxylic acid is isophthalic acid.

Another preferred reaction mixture consists essentially of monocarboxylic acid ester of p-hydroxybenzoic acid, monocarboxylic diester of hydroquinone, an aromatic dicarboxylic acid selected from the group consisting of isophthalic acid, terephthalic acid and 1,5-, 2,5-, 2,6- and 2,7-naphthalic acids and a $C_7$ to $C_{12}$ aliphatic dicarboxylic acid, wherein the mole ratio of aromatic dicarboxylic acid to aliphatic dicarboxylic acid is about 99:1 to about 50:50 and wherein the mole ratio of p-hydroxybenzoic acid ester to hydroquinone diester is in the range of about 1:4.5 to about 3:2. The preferred aromatic dicarboxylic acid is isophthalic acid and the preferred aliphatic dicarboxylic acid is azelaic acid.

The monomer reaction mixture is subjected to an initial melt polymerization in which condensation occurs by acidolysis of the monocarboxylic acid ester groups to form a prepolymer of inherent viscosity in the range of about 0.09 to about 0.16 dl $g^{-1}$ and more preferably in the range of about 0.13 to about 0.15 dl $g^{-1}$. This initial melt polymerization can be conveniently carried out batch wise in a polymerization kettle system or continuously in a gravity type continuous feed reactor. The inherent viscosity should be limited to the range of about 0.09 to about 0.16 dl $g^{-1}$ to provide a prepolymer of a sufficient degree of advancement that it can be readily processed by one pass through a wiped film reactor to advance the molecular weight to the desired level and yet of sufficiently low molecular weight and melt viscosity that it can be readily transferred under low shear conditions from the prepolymer kettle system to the wiped film reactor. In general the temperature of the prepolymerization step is increased throughout the prepolymerization to maintain an adequate reaction rate and allow the volatile condensation products to be removed from the reactor by a distillative process. The reaction temperature is initially above about 100° C. and is raised progressively to as high as about 350° C. depending on the temperature required to maintain the prepolymer molten and to evolve the condensation products. The kettle system for prepolymerization can include one or more kettles equipped with stirrers for progressive polymerization of the prepolymer and a surge tank for accumulation of molten prepolymer for feed on a continuous basis to the wiped film polymerization reactor.

When the desired inherent viscosity has been reached, the molten prepolymer is fed continuously to a countercurrent wiped film reactor capable of handling viscous melts and generating a high shear field. Such a reactor is available as a Filmtruder HS Polymer Machine manufactured and sold by Luwa Corporation, Charlotte, N.C. The reactor provides for transport of a thin agitated film of less than about 0.1 mm to about 10 mm. Advantageously the polymerization step is carried out with a continuous film of polymer subjected to a shear rate of at least about 100 sec$^{-1}$ and more preferably at least about 1000 sec$^{-1}$. Generally the film thickness is in the range of about 1 to about 4 mm and such shear rates can be obtained by operating the rotor of the wiped film reactor at rotor tip speeds of 100 mm sec$^{-1}$ and higher. The wiped film reactor is operated at a temperature below the decomposition temperature of the thermotropic polyester product and in the range in which the thermotropic polyester product forms an anisotropic melt. Generally substantial degradation does not occur below about 350° C. for the thermotropic polyesters described herein and many are stable up to about 400° C. Optical anisotropy of the polymer melt can be determined by placing a sample of the polymer on a heating stage of a polarizing microscope and bringing the temperature up to and beyond the flow point. At the temperature range of formation of an anisotropic melt, a bright field will be observed. Advantageously, the thermotropic polymers are capable of shear thinning when they are in the anisotropic melt phase and therefore do not place excessive loads on the rotor drive. Preferred compositions for production by the process of the invention are those which when they are subjected to a shear rate of 1000 sec$^{-1}$ at a temperature of 5° C. above the initial temperature for formation of an anisotropic melt phase, possess a melt viscosity of less than about 100 Pa.s.

The prepolymer is advantageously fed to the wiped film reactor by a pump operating at a rate slightly less than the rate set for the discharge pump so that polymer flows smoothly through the reactor and does not accumulate therein. The molecular weight of the thermotropic polyester product depends on the rate of polymerization and the residence time of the polymer melt in the reactor. In turn the rate of polymerization is influenced by the temperature, the gas pressure in the reactor and the thickness of the melt film. Advantageously the temperature is maintained about 10° C. above the lowest temperature for formation of the anisotropic melt phase, the gas pressure is maintained below about 3 kPa, the film thickness is maintained at less than 2 mm and the residence time is maintained at less than about 10 minutes. More preferably the gas pressure is maintained in the range of about 0.05 to about 0.5 kPa, and the film thickness is selected in the range of about 1 to about 4 mm. Under such conditions, products of inherent viscosity above about 0.5 dl $g^{-1}$ and preferably above about 0.8 dl $g^{-1}$ are readily obtained.

Stabilizers, colorants, catalysts, processing aids, fillers and pigments may be added to the initial reaction mixture provided that they do not react with it or with the products of the condensation reaction.

The invention is further illustrated but it is not intended to be limited by the following examples in which parts and percentages are by weight unless specified otherwise.

EXAMPLE 1 a. Prepolymer Preparation

A polymerization kettle, capable of being pressurized from 0 up to 1830 kPa, is charged in the following order with:

930 parts by weight acetic anhydride
3 parts by weight trisodium phosphate dodecahydrate
380 parts by weight para-hydroxybenzoic acid
300 parts by weight hydroquinone
77 parts by weight azelaic acid
385 parts by weight isophthalic acid The kettle is sealed, heated to 140° C., and refluxed for 45 min. to acetylate the phenolic groups. Excess acetic anhydride and acetic acid are distilled off until a temperature of 240° C. is reached. The temperature is then controlled at 240° C. and a vacuum of 50 kPa is applied to the vessel until a total of 1035 parts of condensate are collected. The inherent viscosity of the prepolymer is 0.13 dl $g^{-1}$.

b. Polymerization

A Filmtruder HS Polymer Machine of 150 mm diameter is operated at a jacket temperature from 315° to 328° C. The pressure is maintained between 0.26 and 0.65 kPa. The rotor speed is maintained at 280 rpm with a corresponding shear rate of 1,955 sec$^{-1}$. The prepolymer is fed at 18 kg per hour and the discharge pump is adjusted to give a continuous smooth discharge. The residence time in the unit is about 8 minutes. The discharge pump feeds a two hole strand die. The polymer strands are then quenched in a water bath and cut into pellets. The polyester product has an inherent viscosity of 0.99 dl g$^{-1}$.

EXAMPLES 2 and 3

Under the same polymerization conditions set forth in Example 1 except for change in the feed rate and residence time, the following products were obtained from the prepolymer of Example 1:

| Ex. | Feed rate kg hour$^{-1}$ | Residence time mins. | Inherent Viscosity of Product, dl g$^{-1}$ |
|---|---|---|---|
| 2 | 42 | 4 | 0.60 |
| 3 | 30 | 6 | 0.80 |

The inherent viscosity is determined at 30° C. with a solution of 0.5 gram of copolyester per 100 ml of a solvent composed of 60 weight percent phenol and 40 weight percent tetrachloroethane.

The polymer of Example 3 is melt extruded from a 1-oz Arburg extruder at a temperature of 300° C., the hold time in the extruder being 4 sec and the screw speed 180 rpm. The mold temperature is 30° C. and the injection time is 3 sec. The tensile strength of a bar of polymer (12.5 mm×3.2 mm) is 145.5 MPa with 9.9% elongation at failure. The tensile modulus is 3.79 GPa. When the polymer is melt extruded at 350° C. the tensile strength is 176.5 MPa with 12.1% elongation at failure and the tensile modulus is 4.06 GPa. In contrast a sample of polyester of the same composition and inherent viscosity prepared by solid state polymerization, melt extruded at 300° C., has a tensile strength of 95.8 MPa, with 7.2% elongation at failure, and a tensile modulus of 2.48 GPa, and when it is melt extruded at 350° C., the tensile strength of the extruded sample is 134.19 MPa with 12% elongation at failure and tensile modulus is 2.75 GPa.

The melt viscosity of Example 3 at a shear rate of 1000 sec$^{-1}$ is 15.5 Pa.s. In contrast the comparative sample obtained by solid state polymerization has a melt viscosity of 55 Pa.s.

I claim:

1. A process for preparing a thermotropic polyester by condensation of a monomer reaction mixture which comprises:
   (A) melt polymerizing the monomer reactants to provide a prepolymer of inherent viscosity in the range of about 0.09 to about 0.16 dl g$^{-1}$; and
   (B) passing the melt through a wiped film reactor to provide a molten film of polyester subjected to a shear rate of at least about 100 sec$^{-1}$ and an ambient pressure of less than about 3 kPa, the rate of passage of the melt being adjusted to provide a residence time sufficient to allow the molecular weight of the thermotropic polyester to advance to a level at which the inherent viscosity of the polyester is at least about 0.5 dl g$^{-1}$, the temperature of the wiped film reactor being maintained at less than about 400° C. and in the range in which the thermotropic polyester forms an anisotropic melt phase;
wherein the monomer reaction mixture consists essentially of an aromatic dicarboxylic acid and a diphenol ester and wherein the inherent viscosity values are those obtained with solutions of polymer in a solvent pair of phenol and tetrachloroethane (60:40 by weight) containing 0.5 g of polymer per 100 ml of solvent.

2. The process of claim 1 wherein the shear rate is at least about 1000 sec$^{-1}$.

3. The process of claim 2 wherein the apparent melt viscosity of the polyester product determined at a temperature 5° C. above the temperature of formation of the anisotropic melt phase and at a shear rate of about 1000 sec$^{-1}$, is no more than about 100 Pa.s.

4. The process of claim 3 wherein the monomer reaction mixture consists essentially of a diester of a diphenol and a $C_2$ to $C_4$ monocarboxylic acid, an aromatic dicarboxylic acid, and an ester of p-hydroxybenzoic acid and a $C_2$ to $C_4$ monocarboxylic acid.

5. The process of claim 3 wherein the monomer reaction mixture consists essentially of a diester of a diphenol and a $C_2$ to $C_4$ monocarboxylic acid, an aromatic dicarboxylic acid, a $C_7$ to $C_{12}$ aliphatic dicarboxylic acid, and an ester of p-hydroxybenzoic acid and a $C_2$ to $C_4$ monocarboxylic acid.

6. The process of claim 4 wherein the diphenol is hydroquinone, the aromatic dicarboxylic acid is selected from the group consisting of isophthalic acid, terephthalic acid and 1,5-, 2,5-; 2,6- and 2,7-naphthalic acids and wherein the mole ratio of p-hydroxybenzoic acid ester to hydroquinone diester is in the range of about 1:4.5 to about 4:3.

7. The process of claim 6 wherein the aromatic dicarboxylic acid is isophthalic acid.

8. The process of claim 5 wherein the diphenol is hydroquinone, the aromatic dicarboxylic acid is selected from the group consisting of isophthalic acid, terephthalic acid and 1,5-, 2,5-; 2,6- and 2,7-naphthalic acids and wherein the mole ratio of p-hydroxybenzoic acid ester to hydroquionone diester is in the range of about 1:4.5 to about 3:2.

9. The process of claim 8 wherein the mole ratio of aliphatic dicarboxylic acid to aromatic dicarboxylic acid is about 1:99 to about 30:70.

10. The process of claim 9 wherein the aromatic dicarboxylic acid is isophthalic acid and the aliphatic dicarboxylic acid is azelaic acid.

11. The process of claim 4 wherein the diphenol diester is a mixture of hydroquinone diester and 2,2-bis(4-hydroxyphenyl) propane diester containing up to about 20 mole percent 2,2-bis(4-hydroxyphenyl)propane diester, wherein the mole ratio of p-hydroxybenzoic acid ester to diphenol diester is in the range of about 1:4.5 to about 4:3 and wherein the aromatic dicarboxylic acid is selected from the group consisting of isophthalic acid, terephthalic acid, and 1,5-, 2,5-, 2,6- and 2,7-naphthalic acids.

12. The process of claim 1 wherein the melt is passed through the wiped film reactor at a sufficient rate to provide a polyester product of inherent viscosity at least about 0.8 dl g$^{-1}$.

13. The process of claim 1, wherein the diphenol diester is formed in situ by reaction of an acid anhydride with the diphenol.

14. A process for preparing a thermotropic polyester by condensation of a monomer reaction mixture which comprises:
   (A) melt polymerizing the monomer reactants to provide a prepolymer of inherent viscosity in the range of about 0.13 to about 0.15 dl g$^{-1}$; and
   (B) passing the melt through a wiped film reactor to provide a molten film of polyester subjected to a shear rate of at least about 1000 sec$^{-1}$ and an ambient pressure of less than 1.5 kPa, the rate of passage of the melt being adjusted to provide a residence time sufficient to allow the molecular weight of the thermotropic polyester to advance to a level at which the inherent viscosity of the polyester is at least about 0.5 dl g$^{-1}$, the temperature of the wiped film reactor being maintained at less than about 400° C. and in the range in which the thermotropic polyester forms an anisotropic melt phase; wherein the monomer reaction mixture consists essentially of (i) a diester of a $C_2$ to $C_4$ monocarboxylic acid and a diphenol consisting of hydroquinone and from 0 to 20 mole percent 2,2-bis(4-hydroxyphenyl)-propane, (ii) an aromatic dicarboxylic acid selected from the group consisting of isophthalic acid, terephthalic acid, and 1,5-, 2,5-; 2,6- and 2,7-naphthalic acids, and (iii) an ester of a $C_2$ to $C_4$ monocarboxylic acid and p-hydroxybenzoic acid, and wherein the mole ratio of the p-hydroxybenzoic acid ester to the diphenol diester is in the range of about 1:4.5 to about 4:3; and wherein the inherent viscosity values are those obtained with solutions of polymer in a solvent pair of phenol and tetrachloroethane (60:40 by weight) containing 0.5 g of polymer per 100 ml of solvent.

15. The process of claim 13 wherein the melt is passed through the wiped film reactor at a sufficient rate to provide a polyester product of inherent viscosity at least about 0.8 dl g$^{-1}$.

16. The process of claim 13 wherein the aromatic dicarboxylic acid is isophthalic acid.

17. A process for preparing a thermotropic polyester by condensation of a monomer reaction mixture which comprises:
(A) melt polymerizing the monomer reactants to provide a prepolymer of inherent viscosity in the range of about 0.13 to about 0.15 dl g$^{-1}$; and
(B) passing the melt through a wiped film reactor to provide a molten film of polyester subjected to a shear rate of at least about 1000 sec$^{-1}$ and an ambient pressure of less than about 1.5 kPa, the rate of passage of the melt being adjusted to provide a residence time sufficient to allow the molecular weight of the thermotropic polyester to advance to a level at which the inherent viscosity of the polyester is at least about 0.5 dl g$^{-1}$, the temperature of the wiped film reactor being maintained at less than about 400° C. and in the range in which the thermotropic polyester forms an anisotropic melt phase; wherein the monomer reaction mixture consists essentially of (i) a diester of a $C_2$ to $C_4$ monocarboxylic acid and hydroquinone, (ii) an aromatic dicarboxylic acid selected from the group consisting of isophthalic acid, terephthalic acid, and 1,5-, 2,5-; 2,6- and 2,7-napthalic acids, (iii) a $C_7$ to $C_{12}$ aliphatic dicarboxylic acid and (iv) an ester of a $C_2$ to $C_4$ monocarboxylic acid and p-hydroxybenzoic acid, wherein the mole ratio of the aromatic dicarboxylic acid to the aliphatic dicarboxylic acid is about 99:1 to about 70:30 and wherein the mole ratio of the p-hydroxybenzoic acid ester to the hydroquinone diester is in the range of about 1:4.5 to about 3:2; and wherein the inherent viscosity values are those obtained with solutions of polymer in a solvent pair of phenol and tetrachloroethane (60:40 by weight) containing 0.5 g of polymer per 100 ml of solvent.

18. The process of claim 17 wherein the melt is passed through the wiped film reactor at a sufficient rate to provide a polyester product of inherent viscosity at least about 0.8 dl g$^{-1}$.

19. The process of claim 17 wherein the aromatic dicarboxylic acid is isophthalic acid and the aliphatic dicarboxylic acid is azelaic acid.

20. A thermotropic polyester prepared by condensation of a monomer reaction mixture wherein the condensation is effected by:
(A) melt polymerizing the monomer reactants to provide a prepolymer of inherent viscosity in the range of about 0.09 to about 0.16 dl g$^{-1}$; and
(B) passing the melt through a wiped film reactor to provide a molten film of polyester subjected to a shear rate of at least about 100 sec$^{-1}$ and an ambient pressure of less than about 3 kPa, the rate of passage of the melt being adjusted to provide a residence time sufficient to allow the molecular weight of the thermotropic polyester to advance to a level at which the inherent viscosity of the polyester is at least about 0.5 dl g$^{-1}$, the temperature of the wiped film reactor being maintained at less than about 400° C. and in the range in which the thermotropic polyester forms an anisotropic melt phase; wherein the monomer reaction mixture consists essentially of an aromatic dicarboxylic acid and a diphenol ester; and wherein the inherent viscosity values are those obtained with solutions of polymer in a solvent pair of phenol and tetrachloroethane (60:40 by weight) containing 0.5 g of polymer per 100 ml of solvent.

21. The thermotropic polyester of claim 20 wherein the film thickness is less than about 1 mm and wherein the shear rate is at least about 1000 sec$^{-1}$.

22. The thermotropic polyester of claim 21 wherein the apparent melt viscosity of the polyester product determined at a temperature 5° C. above the temperature of formation of the anisotropic melt phase and at a rate of about 1000 sec$^{-1}$, is no more than about 100 Pa.s.

23. The thermotropic polyester of claim 20 wherein the monomer reaction mixture consists essentially of a diester of a diphenol and a $C_2$ to $C_4$ monocarboxylic acid, an aromatic dicarboxylic acid, and an ester of p-hydroxybenzoic acid and a $C_2$ to $C_4$ monocarboxylic acid.

24. The thermotropic polyester of claim 20 wherein the monomer reaction mixture consists essentially of a diester of a diphenol and a $C_2$ to $C_4$ monocarboxylic acid, an aromatic dicarboxylic acid, a $C_7$ to $C_{12}$ aliphatic dicarboxylic acid, and an ester of p-hydroxybenzoic acid and a $C_2$ to $C_4$ monocarboxylic acid.

25. The thermotropic polyester of claim 20 of inherent viscosity at least about 0.8 dl g$^{-1}$.

26. The thermotropic polyester of claim 23 wherein the diphenol is hydroquinone, the aromatic dicarboxylic acid is selected from the group consisting of isophthalic acid, terephthalic acid and 1,5-, 2,5-, 2,6- and 2,7-naphthalic acids and wherein the mole ratio of p-hydroxybenzoic acid ester to hydroquinone diester is in the range of about 1:4.5 to about 4:3.

27. The thermotropic polyester of claim 25 wherein the aromatic dicarboxylic acid is isophthalic acid.

28. The thermotropic polyester of claim 24 wherein the diphenol is hydroquinone, the aromatic dicarboxylic acid is selected from the group consisting of isophthalic acid, terephthalic acid and 1,5-, 2,5-, 2,6- and 2,7-naphthalic acids and wherein the mole ratio of p-hydroxybenzoic acid ester to hydroquinone diester is in the range of about 1:4.5 to about 3:2.

29. The thermotropic polyester of claim 24 wherein the mole ratio of aliphatic dicarboxylic acid to aromatic dicarboxylic acid is about 1:99 to about 30:70.

30. The thermotropic polyester of claim 28 wherein the aromatic dicarboxylic acid is isophthalic acid and the alipahtic dicarboxylic acid is azelaic acid.

* * * * *